(12) United States Patent
Nagai et al.

(10) Patent No.: US 7,035,024 B2
(45) Date of Patent: Apr. 25, 2006

(54) IMAGING LENS

(75) Inventors: Youhei Nagai, Tokyo (JP); Yasuhiko Abe, Toda (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 11/107,242

(22) Filed: Apr. 15, 2005

(65) Prior Publication Data

US 2005/0237633 A1    Oct. 27, 2005

(30) Foreign Application Priority Data

Apr. 27, 2004   (JP)   ............................. 2004-131934

(51) Int. Cl.
G02B 15/14        (2006.01)
G02B 9/12         (2006.01)

(52) U.S. Cl. ...................... 359/785; 359/784; 359/690; 359/689

(58) Field of Classification Search ................ 359/785, 359/690, 784, 773, 774, 689, 687, 686, 716
See application file for complete search history.

(56) References Cited

U.S. PATENT DOCUMENTS

| 5,636,065 | A | 6/1997 | Takato ........................ 359/716 |
| 2002/0012176 | A1 | 1/2002 | Ning |
| 2003/0193605 | A1 | 10/2003 | Yamaguchi |
| 2004/0212901 | A1* | 10/2004 | Nanba et al. ................ 359/785 |

FOREIGN PATENT DOCUMENTS

| EP | 1 348 990 A1 | 10/2003 |
| JP | 8-234097 A | 9/1996 |
| JP | 08-234097 A | 9/1996 |
| JP | 10-048516 A | 2/1998 |
| JP | 11-052227 A | 2/1999 |
| JP | 2004-4566 A | 1/2004 |
| WO | WO-2005/026806 A1 | 3/2005 |
| WO | WO-2005/026807 A1 | 3/2005 |

OTHER PUBLICATIONS

Patent Abstracts of Japan for JP11-052227 published Feb. 26, 1999.
Patent Abstracts of Japan for JP10-048516 published Feb. 20, 1998.
Patent Abstracts of Japan for JP08-234097 published Sep. 13, 1996.
European Search Report for EP 05 00 9108 completed on Ju. 19, 2005.
W. J. Smith, Modern Optical Engineering, Chapter 6, Stops and Apertures, pp 141-143, Mcgraw-hill Book Company, New York.

\* cited by examiner

*Primary Examiner*—Timothy Thompson
(74) *Attorney, Agent, or Firm*—Darby & Darby (57) ABSTRACT

The present invention includes, from the object side to the image plane side, an aperture stop with a predetermined diameter, a first lens with a positive refractive power and a bi-convex shape with convex surfaces facing the object side and the image plane side, a second lens being formed as a meniscus shape with a concave surface facing the object side having a negative refractive power, and a third lens being formed as a meniscus shape with a convex surface facing the object side having a positive refractive power. By having a positive refractive power for the first lens and third lens and a negative refractive power for the second lens, a suitable back focus can be maintained while reducing the total length of the lens system. The imaging lens is thin and compact and has superior optical properties suited for mobile cameras mounted in portable telephones and PDAs.

14 Claims, 5 Drawing Sheets

IMAGING LENS

INCORPORATION BY REFERENCE

The present application claims priority under 35 U.S.C. §119 to Japanese Patent Application No. 2004-131934 filed on Apr. 27, 2004. The content of the application is incorporated herein by reference in its entirety.

BACKGROUND OF THE INVENTION

The present invention relates to an imaging lens used in electronic imaging devices such as digital still cameras and digital video cameras that use solid-state imaging elements such as CCDs and CMOS. More specifically, the present invention relates to an imaging lens suitable for compact mobile cameras installed in portable telephones, portable information terminals (PDAs), and portable personal computers.

Examples of conventional electronic imaging devices that use solid-state imaging elements such as CCDs include monitoring cameras and video cameras. These devices have been used primarily to capture moving images. For this reason, a high degree of performance was not required for these CCDs and imaging lenses.

In recent years, however, as digital still cameras are becoming popular, needs for high-performance solid-state imaging elements and imaging lenses have increased. As a result, significant technological strides have been made in the field of solid-state imaging elements such as CCDs, which have made it possible to obtain images approaching those of film cameras while also providing compactness and a high pixel count in a compact CCD and the like. Thus, a need for providing imaging lenses that provide high performance while being compact, thin, and less expensive has become stronger.

With solid-state imaging elements such as CCDs, a microlens is disposed on the surface thereof to allow efficient entry of light. If the angle of the light incident to the solid-state imaging element is too large, vignetting takes place, which prevents light from entering into the solid-state imaging element. Thus, it is preferable for the exit pupil of the imaging lens to be provided as far as possible from the imaging plane.

Also, it is necessary to keep a certain length of back focus to provide necessary components between the imaging lens and the solid-state imaging element, e.g., a low-pass filter for preventing color moiree and an IR cut filter for correcting spectral sensitivity of the solid-state imaging element.

Conventionally, many cameras have used triplet-type imaging lenses because these use a small number of lenses to provide relatively good optical properties while easily allowing the design to be made compact (see, for example, Japanese Laid-Open Patent Publication Number Hei 07-168095, Japanese Laid-Open Patent Publication Number Hei 10-48516, Japanese Laid-Open Patent Publication Number Hei 08-234097, Japanese Laid-Open Patent Publication Number Hei 07-325251, and Japanese Laid-Open Patent Publication Number Hei 11-52227). With these triplet-type imaging lenses, however, it is difficult to provide back focus relatively long, beside keeping the exit pupil away from the image surface, and providing a very compact design with a wide viewing angle.

SUMMARY OF THE INVENTION

The present invention overcomes the problems of the conventional technology described above and provides an imaging lens with superior optical properties, suited for use in portable telephones and portable information terminals, that uses a very simple three-group three-piece structure and provides a compact, thin, light-weight design that can be used with solid-state imaging elements of 1,000,000 pixels or more.

An imaging lens according to the present invention includes, in sequence from an object side to an image surface side: an aperture stop with a predetermined aperture diameter; a biconvex first lens with convex surfaces facing the object side and the image surface side having a positive refractive power; a meniscus-shaped second lens with a concave surface facing the object side having a negative refractive poser; and a meniscus-shaped third lens with a convex surface facing the object side having a positive refractive power. By providing the first lens and the third lens with a positive refractive power and the second lens with a negative refractive power make it possible to reduce the total length of the lens system while maintaining an appropriate back focus. As a result, a compact and thin imaging lens can be provided while maintaining desired optical properties.

In the structure described above, the second lens and the third lens can be formed with the surfaces on both the object side and the image surface side being aspherical surfaces. With this structure, various aberrations can be effectively corrected, thus providing an imaging lens suited for high-density solid-state imaging elements.

In the structure described above, the third lens can be formed with an inflection point where there is a change in curvature orientation within an effective diameter of the aspherical surface on the image surface side. With this structure, various aberrations, especially astigmatism and distortion, can be effectively corrected while reducing the exit angle.

In the structure described above, the second lens can be formed so that refractive power decreases toward perimeter regions of the aspherical surface on the object side. With this structure, various aberrations, especially astigmatism and coma aberration, can be easily corrected.

In the structure described above, the second lens and the third lens can be formed from a resin material. With this structure, the lens system can be made lighter and more inexpensive than using glass material. More specifically, the aspherical surfaces and surfaces with inflection points can be easily molded.

In the structure described above, condition (1) below can be met, where f is a focal length of the lens system and TL is a total length (air conversion distance) of the lens system from a front surface of the aperture stop to the image surface.

$$TL/f < 1.8 \tag{1}$$

With this structure, the total length of the lens system can be kept short and more compact, with a thinner design.

In the structure described above, condition (2) below can be met, where v1 is an Abbe number of the first lens.

$$v1 > 45 \tag{2}$$

With this structure, effective correction can be provided, especially of lateral chromatic aberration, thus providing preferable optical properties.

In the structure described above, condition (3) below can be met, where f is a focal length of the lens system, D3 is a distance along an optical axis between the first lens and the second lens, and D5 is a distance along the optical axis between the second lens and the third lens.

$$0.05 \leq (D3+D5)/f \leq 0.25$$

With this structure, the total length of the lens system can be kept small while suitable focal length and suitable back focus can be maintained.

With the imaging lens of the present invention described above, a more compact, thinner, lighter-weight, and lower-cost design can be provided for an imaging lens suitable for mobile cameras mounted in portable telephones and portable information terminals. More specifically, an imaging lens with superior optical properties can be provided wherein the total length of the lens system can be reduced, a compact and thin design can be provided, various types of aberration can be effectively corrected, and imaging elements such as CCDs with 1,000,000 pixels or more can be used.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DETAILED DESCRIPTION OF THE PREFERRED EMBODIMENT

The preferred embodiments of the present invention will be described, with references to the attached drawings.

Figure 1:
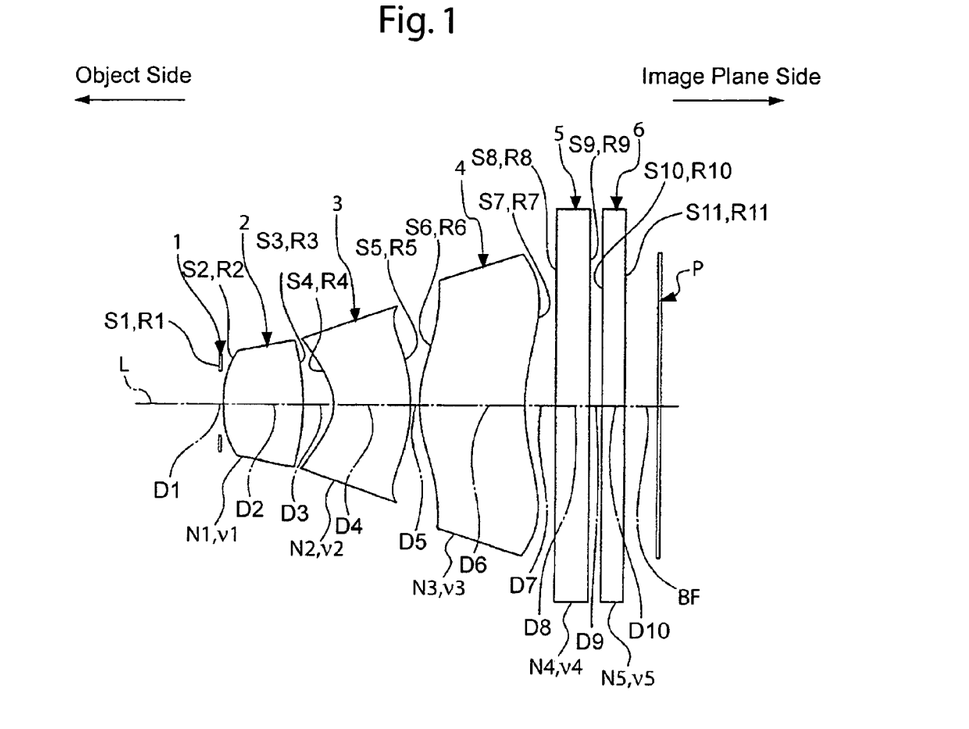
FIG. 1 is a drawing showing the structure of a first embodiment of an imaging lens according to the present invention.

FIG. 1 is a drawing showing the basic architecture of a lens system according to an embodiment of an imaging lens according to the present invention.

In the imaging lens shown in FIG. 1, there are, going in sequence from the object side to the image surface side along the optical axis L: an aperture stop 1 with a predetermined aperture diameter, a biconvex first lens 2 with convex surfaces facing the object side and the image surface side and having a positive refractive power a second lens 3 formed with a meniscus shape with a concave surface facing the object side and having a negative refractive power; and a third lens 4 formed with a meniscus shape with a convex surface facing the object side and having a positive refractive power.

This arrangement also includes, behind the third lens 4, a glass filter 5 and a glass filter 6, e.g., an IR-cut filter and a low-pass filter. Behind this is disposed an image surface P, e.g., a CCD.

In this imaging lens with a three-group, three-piece structure, the first lens 2 forms a first lens group, the second lens 3 forms a second lens group, a third lens 4 forms a third lens group.

With the aperture stop 1, the first lens 2, the second lens 3, the third lens 4, the glass filter 5, and the glass filter 6, their respective surfaces are labeled Si (i=1–11), and the curvature radius of each surface Si is labeled Ri (i=1–11). The index of refraction relative to the line d for the first lens 2, the second lens 3, the third lens 4, and the glass filters 5, 6 are Ni and the Abbe numbers are vi (i=1–5). Furthermore, the distance (thickness, air distance) among the aperture stop 1—the glass filter 6 along the optical axis L are labeled Di (i=1–10), and the back focus from the glass filter 6 to the image surface P is labeled BF.

The focal length of this lens system is labeled f, the total length along the optical axis L from the front surface of the aperture stop 1 (the surface S1 on the object side) to the image surface P is labeled TL (air conversion distance), the distance along the optical axis L between the first lens 2 and the second lens 3 is labeled D3, and the distance along the optical axis L between the second lens 3 and the third lens 4 is labeled D5.

The first lens 1, formed from a glass material or a resin material, e.g., plastic, is a biconvex lens with a positive refractive power having a convex surface for the object-side surface S2 and a convex surface for the image-side surface S3.

The second lens 3, formed from a glass material or a resin material, e.g., plastic, preferably from a resin material, is a meniscus-shaped lens with a concave object-side surface S4 and a convex image-side surface S5. The object-side surface S4 and the image-side surface S5 are both formed as aspherical surfaces. Also, the object-side surface S4 is formed so that the index of refraction diminishes toward the perimeter region.

By using aspherical surfaces for both surfaces S4, S5 in this manner, various types of aberration can be effectively corrected. Also, by having the object-side surface S4 formed so that the index of refraction diminishes toward the perimeter region, astigmatism and coma aberration can be easily corrected. Furthermore, by having the second lens 3 formed from a resin material, complex shapes can be easily formed and the design can be made light-weight and inexpensive.

The third lens 4, formed from a glass material or a resin material, e.g., plastic, preferably from a resin material, is a meniscus-shaped lens with a convex object-side surface S6 and a concave image-side surface S7, with both surfaces formed as aspherical surfaces. Also, the image-side surface S7 is formed with an inflection point, where the curvature orientation changes within the effective diameter range.

By having the surfaces S6, S7 formed as aspherical surfaces, various types of aberration can be corrected effectively. Also, by forming the image-side surface S7 with an inflection point, where the curvature orientation changes within the effective diameter range, various types of aberration can be effectively corrected, especially astigmatism and distortion, while the exit angle can be reduced. Furthermore, by forming the third lens 4 from a resin material, complex shapes can be easily formed while making the design light-weight and inexpensive.

The aspherical surfaces of the second lens 3 and the third lens 4 are defined by the following equation:

$$Z=Cy^2/[1+(1-\epsilon C^2 y^2)^{1/2}]+Dy^4+Ey^6+Fy^8+Gy^{10}$$

where Z is the distance from a plane tangent at the apex of the aspherical surface to a point on the aspherical surface at height y from the optical axis L; y is the height from the optical axis; C is the curvature at the apex of the aspherical surface (1/R); $\epsilon$ is the conic constant; and D, E, F, G are aspherical surface coefficients.

In this structure, the focal length f of the lens system and the total length TL of the lens system (air conversion distance) are set up to meet the following condition (1):

$$\text{i } TL/f<1.8 \quad (1)$$

This condition relates to making the lens system design thinner and defines the appropriate ratio between the dimension of the lens system along the optical axis L and the suitable focal length for the entire lens system. More specifically, by meeting this condition, the lens system can be made thinner and more compact.

In this structure, the Abbe number v1 of the first lens 2 is set up to meet the following condition (2):

$$v1>45 \quad (2)$$

This condition defines an appropriate Abbe number range for the first lens 2. Meeting this condition makes it possible to correct various types of aberration, especially lateral chromatic aberration, effectively.

Also, in this structure, the distance D3 between the first lens 2 and the second lens 3 along the optical axis L and the distance D5 between the second lens 3 and the third lens 4 along the optical axis L are set up to meet the following condition (3):

$$0.05 \leq (D3+D5)/f \leq 0.25 \quad (3)$$

This condition defines the position of the second lens 3 in the lens system. More specifically, if the value of (D3+D5)/f is less than 0.05, the angle of view becomes narrow or interference takes place at the lens edge. On the other hand, if the value of (D3+D5)/f is greater than 0.25, the total length of the lens system becomes long. Thus, by meeting this condition, the total length of the lens system can be kept short while maintaining an appropriate focal length and back focus.

Figure 2:
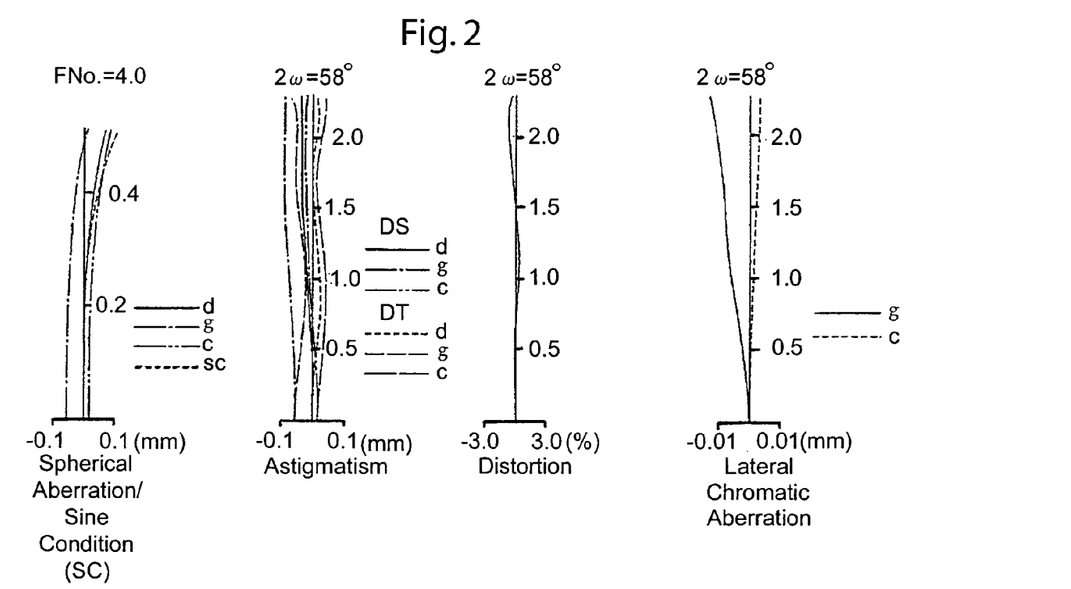
FIG. 2 shows aberration diagrams for spherical aberration, astigmatism, distortion, and lateral chromatic aberration for an imaging lens according to the first embodiment.
Figure 4:
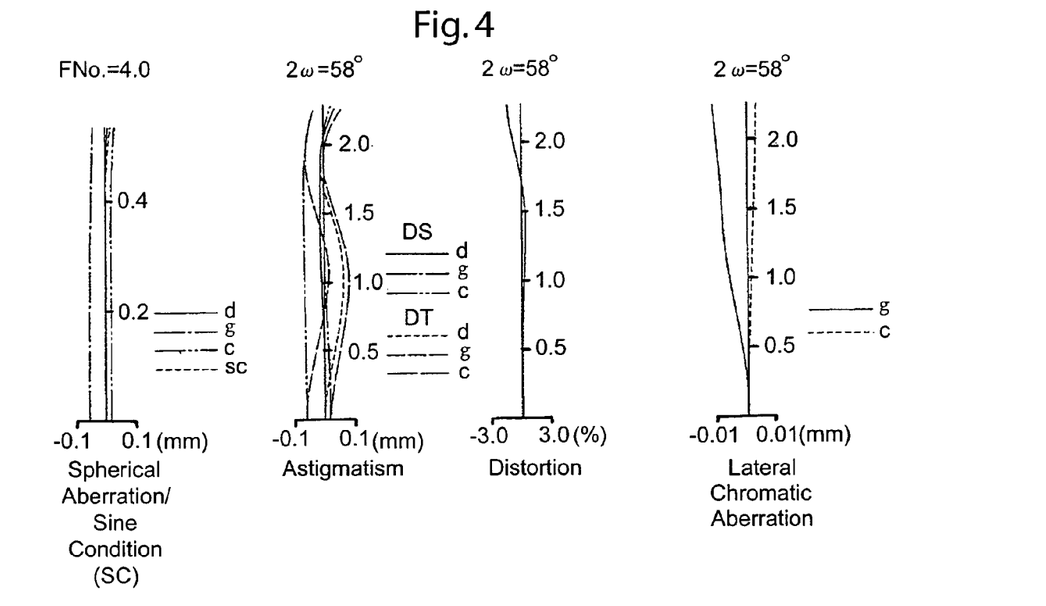
FIG. 4 shows aberration diagrams for spherical aberration, astigmatism, distortion, and lateral chromatic aberration for an imaging lens according to the second embodiment.
Figure 6:
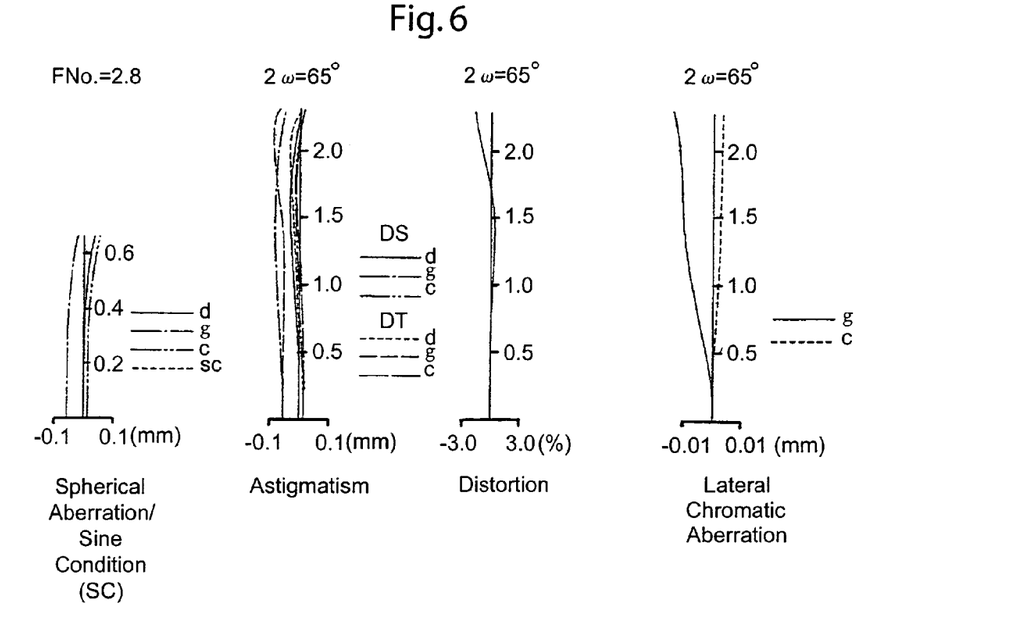
FIG. 6 shows aberration diagrams for spherical aberration, astigmatism, distortion, and lateral chromatic aberration for an imaging lens according to the third embodiment.
Figure 8:
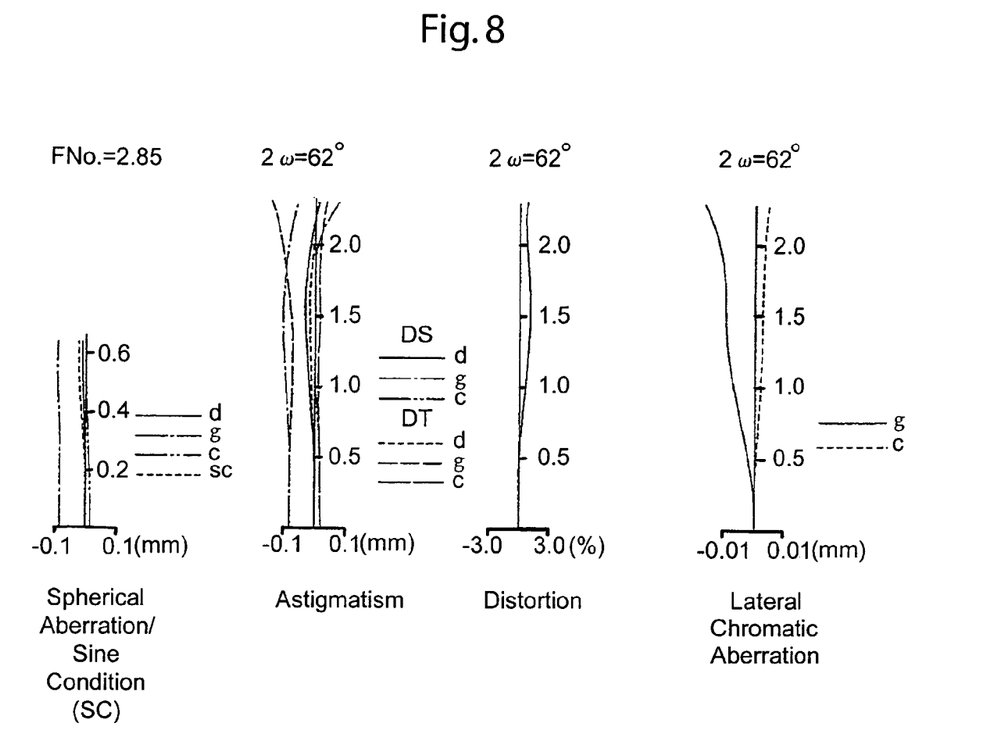
FIG. 8 shows aberration diagrams for spherical aberration, astigmatism, distortion, and lateral chromatic aberration for an imaging lens according to the fourth embodiment.

Embodiments where specific numerical values are used for the above structure will be described below in the form of first embodiment, second embodiment, third embodiment, and fourth embodiment. Also, with regard to the aberration diagrams for spherical aberration, astigmatism, distortion, and lateral chromatic aberration, the results for the first embodiment are shown in FIG. 2, the results for the second embodiment are shown in FIG. 4, the results for the third embodiment are shown in FIG. 6, and the results for the fourth embodiment are shown in FIG. 8. In the aberration diagrams in FIG. 2, FIG. 4, FIG. 6, and FIG. 8, the aberration at the line d is indicated by d, the aberration at the line g is indicated by g, and the aberration at the line c is indicated by c. SC indicates offense against the sine condition, DS indicates sagittal plane aberration, and DT indicates meridional plane aberration.

Figure 3:
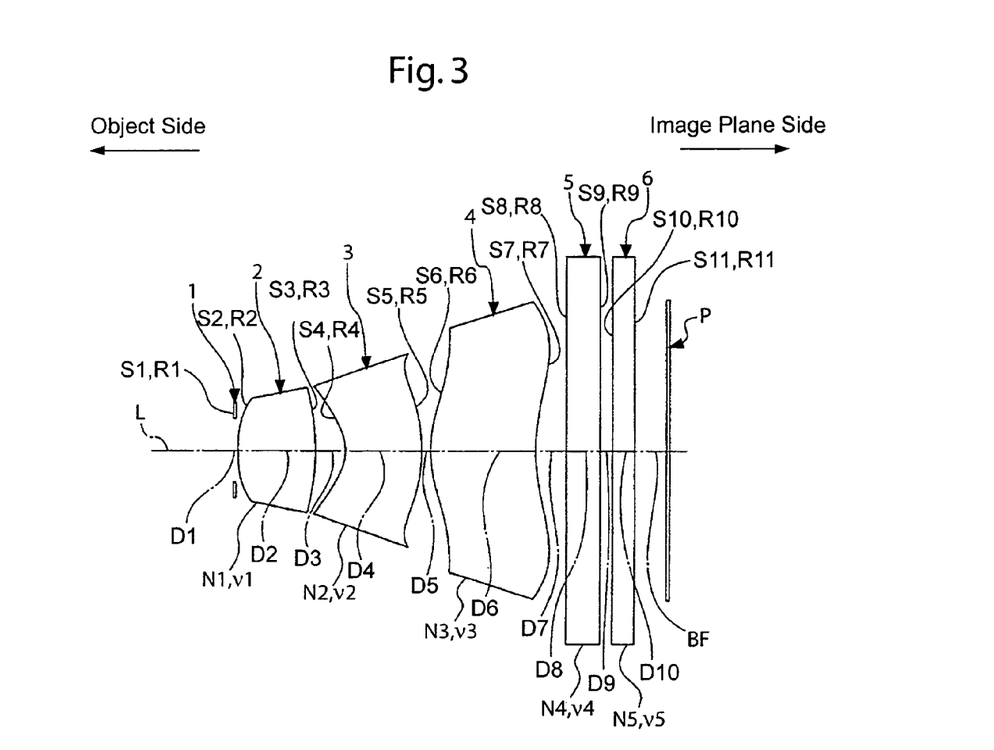
FIG. 3 is a drawing showing the structure of a second embodiment of an imaging lens according to the present invention.
Figure 5:
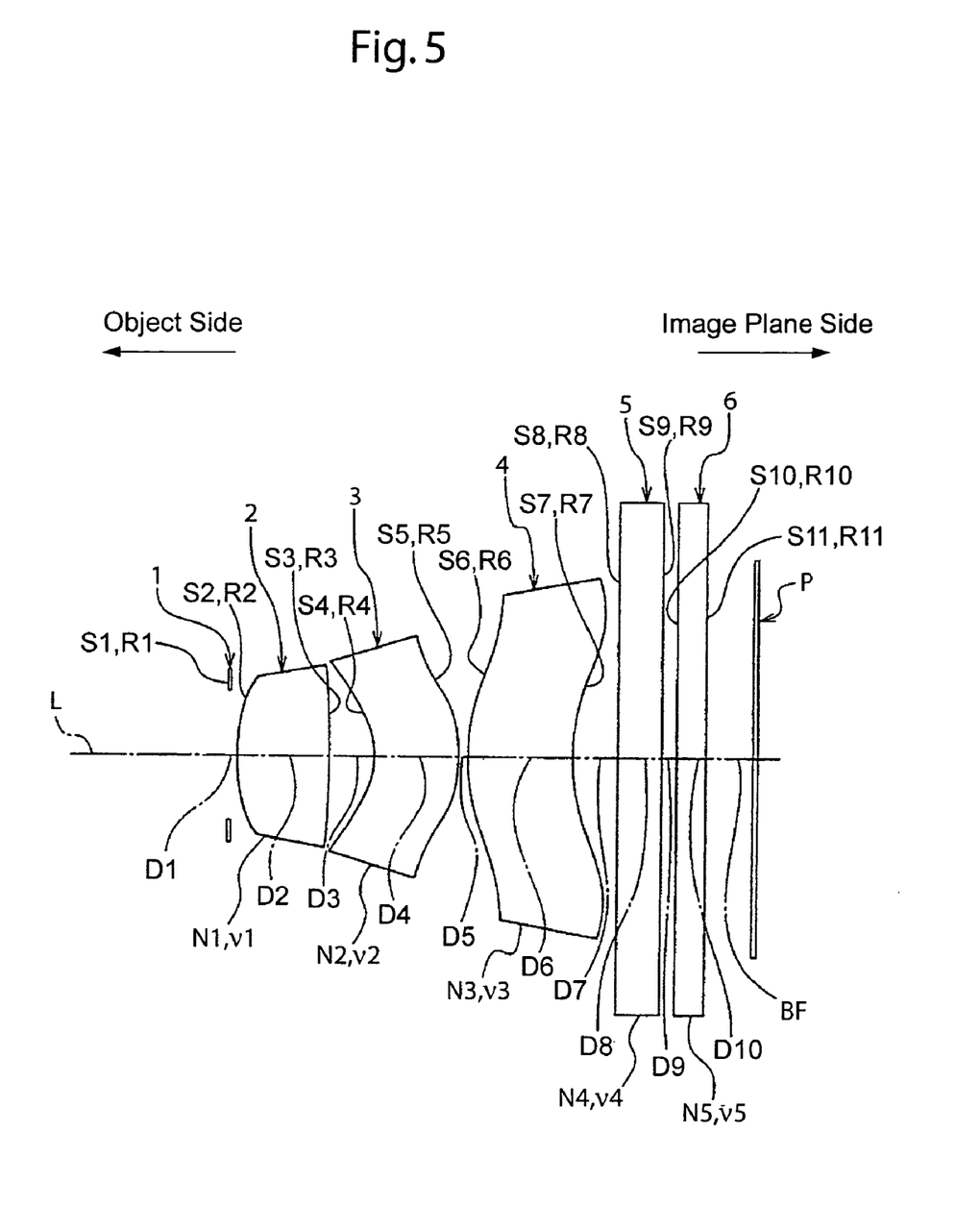
FIG. 5 is a drawing showing the structure of a third embodiment of an imaging lens according to the present invention.
Figure 7:
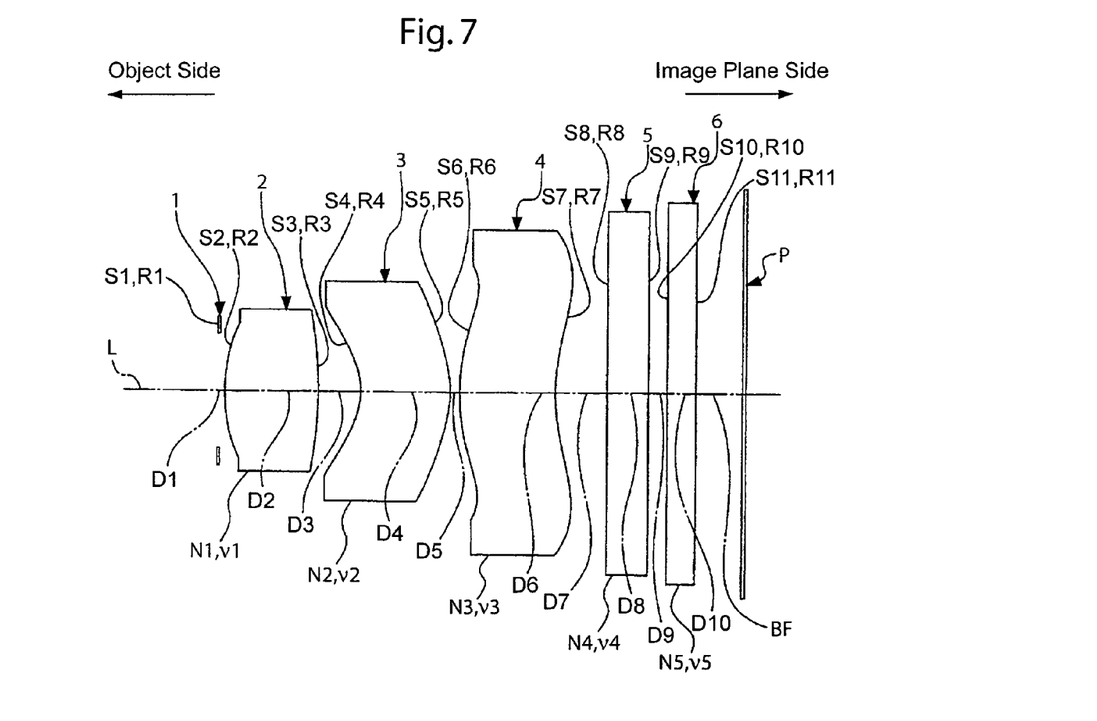
FIG. 7 is a drawing showing the structure of a fourth embodiment of an imaging lens according to the present invention.

FIG. 3, FIG. 5, and FIG. 7 show the basic structures of the second embodiment, the third embodiment, and the fourth embodiment, respectively. Since those basic structures are same as FIG. 1, except for the differences of the numerical data (setting) for each embodiment, the corresponding descriptions will be omitted here.

The basic structure of a lens system according to the first embodiment is shown in FIG. 1. The various specifications are shown in Table 1, the various numerical data (settings) are shown in Table 2, and numerical data relating to aspherical surfaces are shown in Table 3.

In this embodiment, the numerical data for each condition is as follows: (1) TL/f=5.79/4.10=1.41; (2) v1=70.4; (3) (D3+D5)/f=(0.41+0.13)/4.1=0.13.

TABLE 1

| Object Distance (mm) | 700 | Angle of View (2 ω) | 58° |
|---|---|---|---|
| Focal Length f (mm) | 4.1 | Total Length TL of Lens System (Front Surface of Aperture Stop to Image Surface) (Air Conversion Distance) (mm) | 5.79 |
| F Number | 4.0 | Back Focus (Air Conversion) (mm) | 1.41 |

TABLE 2

| Surface | | Curvature radius (mm) | Distance (mm) | Index of Refraction (line d) | | Abbe number |
|---|---|---|---|---|---|---|
| S1 | R1 | ∞ | | | | |
| | Aperture Stop | | | | | |
| | | | D1 0.05 | | | |
| S2 | R2 | 1.893 | D2 1.12 | N1 1.48749 | v1 | 70.4 |
| S3 | R3 | −4.187 | | | | |
| | | | D3 0.41 | | | |
| S4* | R4 | −0.981 | D4 1.17 | N2 1.50914 | v2 | 56.4 |
| S5* | R5 | −2.397 | | | | |
| | | | D5 0.13 | | | |
| S6* | R6 | 2.114 | D6 1.50 | N3 1.50914 | v3 | 56.4 |
| S7* | R7 | 3.019 | | | | |
| | | | D7 0.45 | | | |
| S8 | R8 | ∞ | D8 0.30 | N4 1.51633 | v4 | 64.1 |
| S9 | R9 | ∞ | | | | |
| | | | D9 0.20 | | | |
| S10 | R10 | ∞ | D10 0.30 | N5 1.51633 | v5 | 64.1 |
| S11 | R11 | ∞ | | | | |
| | | | BF 0.40 | | | |

*aspherical surface

TABLE 3

| Aspherical Surface Coefficient | | Numerical Data |
|---|---|---|
| Surface S4 | $\epsilon$ | −0.862382 |
| | D | $0.78392 \times 10^{-2}$ |
| | E | −0.19869 |
| | F | 0.34182 |
| | G | −0.17043 |
| Surface S5 | $\epsilon$ | −0.40173 |
| | D | $-0.23979 \times 10^{-2}$ |
| | E | $0.69879 \times 10^{-2}$ |
| | F | $0.83591 \times 10^{-3}$ |
| | G | $0.28728 \times 10^{-2}$ |
| Surface S6 | $\epsilon$ | −1.749003 |
| | D | $-0.55564 \times 10^{-1}$ |
| | E | $0.14401 \times 10^{-1}$ |
| | F | $-0.49223 \times 10^{-2}$ |
| | G | $0.84089 \times 10^{-3}$ |

TABLE 3-continued

| Aspherical Surface Coefficient | | Numerical Data |
|---|---|---|
| Surface S7 | ε | 0.1658014 |
| | D | $-0.31130 \times 10^{-1}$ |
| | E | $-0.23049 \times 10^{-2}$ |
| | F | $0.57665 \times 10^{-3}$ |
| | G | $-0.34849 \times 10^{-4}$ |

In the first embodiment, the total length of the lens system (the front surface S1 of the aperture stop 1 to the image surface P) is 5.79 mm (air conversion distance), the back focus (air conversion) is 1.41 mm, the F number is 4.0, the angle of view (2ω) is 58°. Thus, there is provided an imaging lens with superior optical properties that is thin, having a short total length, and those various types of aberration are effectively corrected.

The basic structure of a lens system according to the second embodiment is shown in FIG. 3. The main specification data are shown in Table 4, the various numerical data (settings) are shown in Table 5, and numerical data relating to aspherical surfaces are shown in Table 6.

In this embodiment, the numerical data for each condition is: (1) TL/f=6.05/4.30=1.41; (2) v1=70.4; (3) (D3+D5)/f= (0.43+0.10)/4.3=0.12.

TABLE 4

| Object Distance (mm) | 700 | Angle of View (2 ω) | 58° |
|---|---|---|---|
| Focal Length f (mm) | 4.3 | Total Length TL of Lens System (Front Surface of Aperture Stop to Image Surface) (Air Conversion Distance) (mm) | 6.05 |
| F Number | 4.0 | Back Focus (Air Conversion) (mm) | 1.64 |

TABLE 5

| Surface | Curvature radius (mm) | | Distance (mm) | Index of Refraction (line d) | | Abbe number |
|---|---|---|---|---|---|---|
| S1 | R1 | ∞ | | | | |
| | Aperture Stop | | | | | |
| | | | D1 | 0.05 | | |
| S2 | R2 | 2.152 | D2 | 1.15 | N1 | 1.48749 v1 | 70.4 |
| S3 | R3 | −3.497 | | | | |
| | | | D3 | 0.43 | | |
| S4* | R4 | −0.954 | D4 | 1.15 | N2 | 1.50914 v2 | 56.4 |
| S5* | R5 | −2.281 | | | | |
| | | | D5 | 0.10 | | |
| S6* | R6 | 2.094 | D6 | 1.53 | N3 | 1.50914 v3 | 56.4 |
| S7* | R7 | 2.881 | | | | |
| | | | D7 | 0.45 | | |
| S8 | R8 | ∞ | D8 | 0.45 | N4 | 1.51633 v4 | 64.1 |
| S9 | R9 | ∞ | | | | |
| | | | D9 | 0.20 | | |
| S10 | R10 | ∞ | D10 | 0.30 | N5 | 1.51633 v5 | 64.1 |
| S11 | R11 | ∞ | | | | |
| | | | BF | 0.40 | | |

*aspherical surface

TABLE 6

| Aspherical Surface Coefficient | | Numerical Data |
|---|---|---|
| Surface S4 | ε | −1.012741 |
| | D | $0.15770 \times 10^{-2}$ |
| | E | $-0.15701 \times 10^{-1}$ |
| | F | $0.14184 \times 10^{-1}$ |
| | G | $-0.11140 \times 10^{-2}$ |
| Surface S5 | ε | −1.756035 |
| | D | $-0.17180 \times 10^{-2}$ |
| | E | $0.33794 \times 10^{-1}$ |
| | F | $-0.18891 \times 10^{-1}$ |
| | G | $0.45430 \times 10^{-2}$ |
| Surface S6 | ε | −1.157114 |
| | D | $-0.50479 \times 10^{-1}$ |
| | E | $0.17071 \times 10^{-1}$ |
| | F | $-0.60630 \times 10^{-2}$ |
| | G | $0.63700 \times 10^{-3}$ |
| Surface S7 | ε | 0.461228 |
| | D | $-0.28183 \times 10^{-1}$ |
| | E | $0.12080 \times 10^{-2}$ |
| | F | $-0.54800 \times 10^{-3}$ |
| | G | $0.60050 \times 10^{-4}$ |

In the second embodiment, the total length of the lens system (the front surface S1 of the aperture stop 1 to the image surface P) is 6.05 mm (air conversion distance), the back focus (air conversion) is 1.64 mm, the F number is 4.0, and the angle of view (2ω) is 58°. Thus, there is provided an imaging lens with superior optical properties that is thin, having a short total length, whose various types of aberration are effectively corrected.

The basic structure of a lens system according to the third embodiment is shown in FIG. 5. The main specification data are shown in Table 7, the various numerical data (settings) are shown in Table 8, and numerical data relating to aspherical surfaces are shown in Table 9.

In this embodiment, the numerical data for each condition is: (1) TL/f=5.44/3.75=1.45; (2) v1=70.4; (3) (D3+D5)/f= (0.49+0.10)/3.75=0.16.

TABLE 7

| Object Distance (mm) | 700 | Angle of View (2 ω) | 65 ° |
|---|---|---|---|
| Focal Length f (mm) | 3.75 | Total Length TL of Lens System (Front Surface of Aperture Stop to Image Surface) (Air Conversion Distance) (mm) | 5.44 |
| F Number | 2.8 | Back Focus (Air Conversion) (mm) | 1.70 |

TABLE 8

| Surface | Curvature radius (mm) | | Distance (mm) | Index of Refraction (line d) | | Abbe number |
|---|---|---|---|---|---|---|
| S1 | R1 | ∞ | | | | |
| | Aperture Stop | | | | | |
| | | | D1 | 0.05 | | |
| S2 | R2 | 1.934 | D2 | 1.00 | N1 | 1.48749 v1 | 70.4 |
| S3 | R3 | −38.00 | | | | |
| | | | D3 | 0.49 | | |
| S4* | R4 | −1.038 | D4 | 0.94 | N2 | 1.50914 v2 | 56.4 |
| S5* | R5 | −1.465 | | | | |
| | | | D5 | 0.10 | | |
| S6* | R6 | 1.920 | D6 | 1.16 | N3 | 1.50914 v3 | 56.4 |
| S7* | R7 | 2.108 | | | | |
| | | | D7 | 0.50 | | |

TABLE 8-continued

| Surface | Curvature radius (mm) | | Distance (mm) | | Index of Refraction (line d) | | Abbe number |
|---|---|---|---|---|---|---|---|
| S8 | R8 | ∞ | D8 | 0.45 N4 | 1.51633 | ν4 | 64.1 |
| S9 | R9 | ∞ | | | | | |
| | | | D9 | 0.20 | | | |
| S10 | R10 | ∞ | D10 | 0.30 N5 | 1.51633 | ν5 | 64.1 |
| S11 | R11 | ∞ | | | | | |
| | | | BF | 0.50 | | | |

*aspherical surface

TABLE 9

| Aspherical Surface Coefficient | | Numerical Data |
|---|---|---|
| Surface S4 | ϵ | 0.0 |
| | D | 0.10215 |
| | E | −0.12757 |
| | F | 0.13558 |
| | G | −0.43424 × 10⁻¹ |
| Surface S5 | ϵ | −0.598452 |
| | D | −0.11105 × 10⁻¹ |
| | E | −0.56360 × 10⁻² |
| | F | 0.17281 × 10⁻¹ |
| | G | −0.15760 × 10⁻² |
| Surface S6 | ϵ | −0.462717 |
| | D | −0.44799 × 10⁻¹ |
| | E | 0.33020 × 10⁻² |
| | F | 0.60700 × 10⁻³ |
| | G | −0.17600 × 10⁻³ |
| Surface S7 | ϵ | −0.139131 |
| | D | −0.40271 × 10⁻¹ |
| | E | 0.14818 × 10⁻⁴ |
| | F | 0.56800 × 10⁻³ |
| | G | −0.70572 × 10⁻⁴ |

In the third embodiment, the total length of the lens system (the front surface S1 of the aperture stop 1 to the image surface P) is 5.44 mm (air conversion distance), the back focus (air conversion) is 1.70 mm, the F number is 2.8, and the angle of view (2ω) is 65°. Thus, there is provided an imaging lens with superior optical properties that is thin, having a short total length, whose various types of aberration are effectively corrected.

The basic structure of a lens system according to the fourth embodiment is shown in FIG. 7. The main specification data are shown in Table 10, the various numerical data (settings) are shown in Table 11, and numerical data relating to aspherical surfaces are shown in Table 12. In this embodiment, the numerical data for each condition is: (1) TL/f=5.37/3.80=1.41; (2) ν1=56.4; (3) (D3+D5)/f=(0.44+0.10)/3.80=0.14.

TABLE 10

| Object distance (mm) | 700 | Angle of view (2 ω) | 62° |
|---|---|---|---|
| Focal length f (mm) | 3.80 | Total Length TL of Lens System (Front Surface of Aperture Stop to Image Surface) (Air Conversion Distance) (mm) | 5.37 |
| F number | | 2.85 | Back Focus (Air Conversion) (mm) | 1.76 |

TABLE 11

| Surface | Curvature radius (mm) | | Distance (mm) | | Index of Refraction (line d) | | Abbe number |
|---|---|---|---|---|---|---|---|
| S1 | R1 | ∞ | | | | | |
| | Aperture Stop | | | | | | |
| | | | D1 | 0.05 | | | |
| S2 | R2 | 2.000 | D2 | 1.00 N1 | 1.50914 | ν1 | 56.4 |
| S3 | R3 | −7.090 | | | | | |
| | | | D3 | 0.44 | | | |
| S4* | R4 | −0.992 | D4 | 0.97 N2 | 1.50914 | ν2 | 56.4 |
| S5* | R5 | −1.704 | | | | | |
| | | | D5 | 0.10 | | | |
| S6* | R6 | 1.982 | D6 | 1.04 N3 | 1.50914 | ν3 | 56.4 |
| S7* | R7 | 2.536 | | | | | |
| | | | D7 | 0.56 | | | |
| S8 | R8 | ∞ | D8 | 0.45 N4 | 1.51633 | ν4 | 64.1 |
| S9 | R9 | ∞ | | | | | |
| | | | D9 | 0.20 | | | |
| S10 | R10 | ∞ | D10 | 0.30 N5 | 1.51633 | ν5 | 64.1 |
| S11 | R11 | ∞ | | | | | |
| | | | BF | 0.50 | | | |

*aspherical surface

TABLE 12

| Aspherical Surface Coefficient | | Numerical Data |
|---|---|---|
| Surface S4 | ϵ | −0.914977 |
| | D | 0.67813 × 10⁻¹ |
| | E | −0.10197 |
| | F | 0.91784 × 10⁻¹ |
| | G | −0.28052 × 10⁻¹ |
| Surface S5 | ϵ | −2.289778 |
| | D | −0.10446 × 10⁻¹ |
| | E | 0.12025 × 10⁻¹ |
| | F | −0.32957 × 10⁻² |
| | G | 0.31987 × 10⁻² |
| Surface S6 | ϵ | 0.0 |
| | D | −0.66725 × 10⁻¹ |
| | E | −0.13403 × 10⁻³ |
| | F | −0.81653 × 10⁻³ |
| | G | −0.10059 × 10⁻² |
| Surface S7 | ϵ | −0.943849 |
| | D | −0.40313 × 10⁻¹ |
| | E | −0.25911 × 10⁻³ |
| | F | −0.11559 × 10⁻² |
| | G | 0.15674 × 10⁻³ |

In the fourth embodiment, the total length of the lens system (the front surface S1 of the aperture stop 1 to the image surface P) is 5.37 mm (air conversion distance), the back focus (air conversion) is 1.76 mm, the F number is 2.85, and the angle of view (2ω) is 62°. Thus, there is provided an imaging lens with superior optical properties that is thin, having a short total length, whose various types of aberration are effectively corrected.

The imaging lens according to the present invention as described above can be used as an imaging lens for electronic imaging devices, e.g., digital still cameras and digital video cameras, equipped with solid-state imaging elements, e.g., CCDs. More specifically, the present invention can be used as an imaging lens for compact mobile cameras mounted on portable telephones, portable personal computers, and portable information terminals (PDAs) and the like.

What is claimed is:

1. An imaging lens comprising, in sequence from an object side to an image surface side:
   an aperture stop with a predetermined aperture diameter;
   a biconvex and bispherical first lens with convex surfaces facing said object side and said image surface side, having a positive refractive power;

a meniscus-shaped second lens with a concave surface facing said object side having a negative refractive power; and a meniscus-shaped third lens with a convex surface facing said object side having a positive refractive power, wherein TL/f<1.8, where f is a focal length of said lens system formed from said first lens, said second lends, and said third lens, and TL is a total length (air conversion distance) of said lens system from a front surface of said aperture stop to an image surface.

2. An imaging lens as described in claim 1 wherein said second lens and said third lens are formed with aspherical surfaces on both said object side and said image surface side.

3. An imaging lens as described in claim 2 wherein said third lens is formed with an inflection point where there is a change in curvature orientation within an effective diameter of said aspherical surface on said image surface side.

4. An imaging lens as described in claim 2 wherein said second lens is formed so that refractive power decreases toward perimeter regions of said aspherical surface on said object side.

5. An imaging lens as described in claim 1 wherein said second lens and said third lens are formed from a resin material.

6. An imaging lens as described in claim 1 wherein $v1>45$, where $v1$ is an Abbe number of said first lens.

7. An imaging lens as described in claim 1 wherein $0.05 \leq (D3 + D5)/f \leq 0.25$, where f is a focal length of said lens system, D3 is a distance along an optical axis between said first lens and said second lens, and D5 is a distance along said optical axis between said second lens and said third lens.

8. An imaging lens as described in claim 2 wherein said second lens and said third lens are formed from a resin material.

9. An imaging lens as described in claim 3 wherein said second lens and said third lens are formed from a resin material.

10. An imaging lens as described in claim 4 wherein said second lens and said third lens are formed from a resin material.

11. An imaging lens as described in claim 2 wherein $v1>45$, where $v1$ is an Abbe number of said first lens.

12. An imaging lens as described in claim 3 wherein $v1>45$, where $v1$ is an Abbe number of said first lens.

13. An imaging lens as described in claim 4 wherein $v1>45$, where $v1$ is an Abbe number of said first lens.

14. An imaging lens as described in claim 5 wherein $v1>45$, where $v1$ is an Abbe number of said first lens.

* * * * *